United States Patent [19]
Kamp et al.

[11] 3,722,385
[45] Mar. 27, 1973

[54] COMBINED FILM PACK AND STRIP METERING MECHANISM FOR ADVANCING FILM

[75] Inventors: Leonard F. Kamp, Rochester; William P. Ewald, Webster, both of N.Y.

[73] Assignee: Eastman Kodak Company, Rochester, N.Y.

[22] Filed: June 24, 1971

[21] Appl. No.: 156,252

[52] U.S. Cl. .....................................95/22, 95/31 R
[51] Int. Cl. ............................................G03b 19/04
[58] Field of Search .161/38; 95/13, 22, 31 R, 31 CA

[56] References Cited

UNITED STATES PATENTS

| | | | |
|---|---|---|---|
| 1,103,417 | 7/1914 | Hopkins | 95/22 |
| 1,245,760 | 11/1917 | Moxon | 95/22 |
| 1,294,429 | 2/1919 | Edelman | 95/22 X |
| 3,412,662 | 11/1968 | Balalis | 95/31 X |
| 2,930,299 | 3/1960 | Land | 95/22 X |
| 3,486,964 | 12/1969 | Brienlid | 161/38 |
| 688,579 | 12/1901 | Bartlett | 95/22 X |
| 3,324,778 | 6/1967 | Everett | 95/31 |

Primary Examiner—Samuel S. Matthews
Assistant Examiner—Michael L. Gellner
Attorney—William T. French et al.

[57] ABSTRACT

A film pack having a strip metering mechanism for advancing a roll of film in predetermined increments or steps for use in a camera of the instant processing type which receives conventional film packs and does not have a film roll advancing facility. The metering mechanism comprises a metering strip coupled to a roll of film and having a leader extending out of the camera which when manually pulled advances the film successive predetermined lengths or increments for exposure. The metering strip comprises interleaved pull tabs having their leading and trailing ends sealed together in overlapped relation. The film pack or camera is provided with a severing mechanism for at least partially severing the seal between the trailing and leading ends of the pull tabs, and thereby sufficiently weakening the seal to cause the leading pull tab to detach from the succeeding pull tab at the instant that the film has been advanced to locate a predetermined increment of film in a correct exposure position.

19 Claims, 4 Drawing Figures

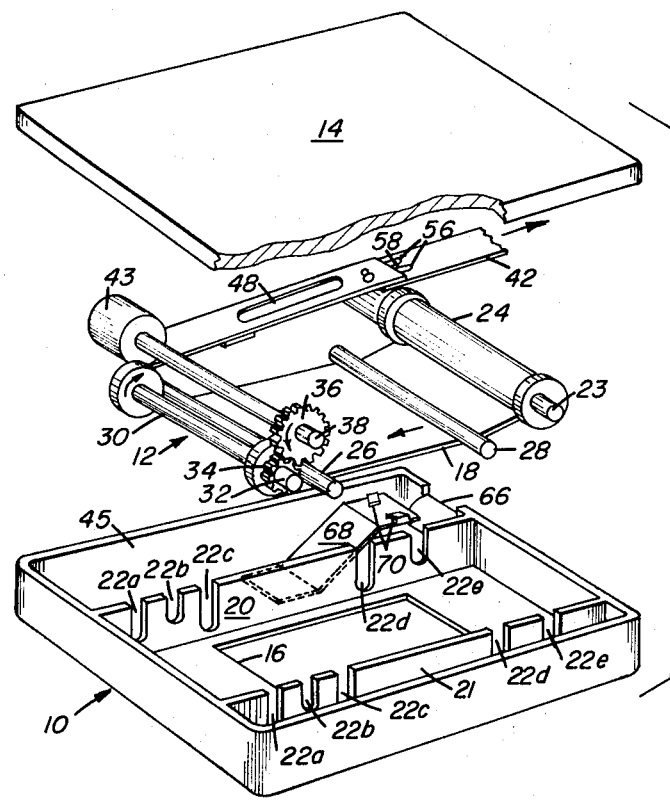
FIG. 1
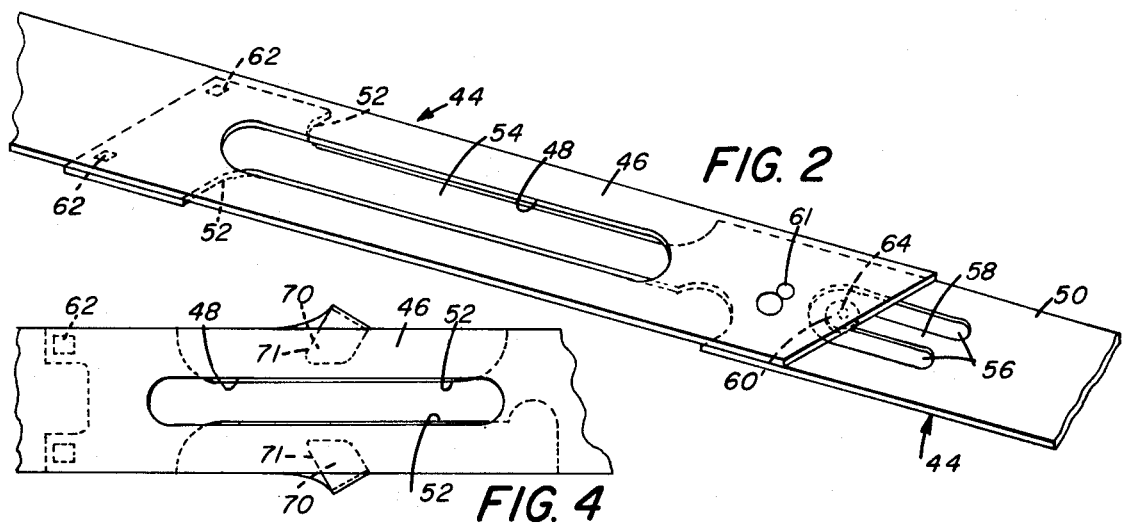
FIG. 2
FIG. 4
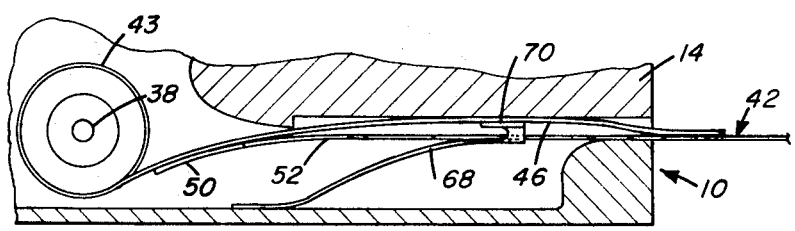
FIG. 3
LEONARD F. KAMP
WILLIAM P. EWALD
INVENTORS
BY *Steve W. Grambaw*
ATTORNEY

COMBINED FILM PACK AND STRIP METERING MECHANISM FOR ADVANCING FILM

CROSS-REFERENCE TO RELATED APPLICATION

Reference is made to commonly assigned copending U. S. Pat. No. 3,682,065, entitled "Photographic Film Pack," filed in the name of William P. Ewald, and U. S. patent application Ser. No. 156,253, entitled "Strip Metering Mechanisms for Advancing Film in a Camera," filed in the names of Leonard F. Kamp and William P. Ewald.

BACKGROUND OF THE INVENTION

1. Field of the Invention

This invention relates generally to film advancing and metering mechanisms for cameras or the like, and more specifically to a combined film pack and strip metering mechanism for advancing roll film successive predetermined increments for exposure.

2. Description of the Prior Art

Cameras of the instant processing type which use film packs are well known in the art. Such cameras are adapted to receive conventional film packs of the type which are insertable into the camera. Such film packs normally comprise an assemblage of film units, each unit comprising a photosensitive sheet and a print receiving sheet in which a leader is attached to each film unit at a position spaced from the leading end of the film unit. The leader protrudes from the camera and is pulled to advance the leading end of the first film unit between pressure applying members. At this point, the leader detaches from the film unit, the leading end of which is manually grasped and pulled through the pressure applying members. This advances the succeeding film unit to an exposure position with a portion of its leader protruding from the camera. Since such cameras use film packs of the described type, they do not need and hence do not have a window in the back of the camera through which numbers or indicia on a film can be viewed. In addition, such cameras do not need and hence are not equipped with means and mechanism for successively advancing film in increments or steps from a supply roll of film to a take-up spool. Accordingly, if such cameras are adapted to handle a film pack having a film roll and take-up spool, the problem arises of how to advance and meter the film to locate successive unexposed increments of the film in a correct position for exposure. A solution to this problem is presented in film packs described in the aforementioned copending U.S. Pat. No. 3,682,065, and Ser. No. 156,253. This application is directed to an improved film pack utilizing a metering strip for advancing film in roll form in predetermined increments.

SUMMARY OF THE INVENTION

This invention includes within its scope an improved roll film pack for use in a camera of the instant processing type having neither a film advancing mechanism nor a viewing window through which indicia on a film backing paper may be seen or viewed. The film pack has a roll film supply and take-up spool, and a film advancing mechanism comprising a metering strip coupled to the film and having a leader extending out of the film pack and camera. The metering strip is formed from a plurality of interleaved pull tabs in which the trailing end of one tab and the leading end of the succeeding tab are positioned in overlapped relation and sealed together. A severing mechanism is provided operative in timed relation to the pull tabs for partially severing the seal and causing detachment of the leading pull tab at the instant that a succeeding predetermined increment of film is in correct position for exposure. In a preferred embodiment of the invention, the severing mechanism comprises a leaf spring having a pair of spaced apart knife blades at one end that are movable through corresponding notches in one of the tab ends into a position between the tab ends for partially severing the overlapped sealed ends upon continued withdrawal of the leading pull tab. The cutting edges of the blades are beveled relative to the seals for camming the seals apart placing the tab under tension along its width, thereby assisting the severing operation by preventing outward movement of the seals and firmly holding the seals against the cutting edges of the blades. When the seal between the overlapped ends of the pull tabs is sufficiently weakened, the leading pull tab will detach from the succeeding pull tab, and such detachment is designed to occur at the instant that a succeeding predetermined increment of film is in correct position for exposure.

It is therefore one of the objects of the present invention to provide an improved film pack for conventional roll film that is usable in cameras of the instant processing type.

Another object of the invention is to provide an improved film pack for a roll of film having an improved built-in film advancing and metering mechanism for locating successive predetermined increments of the film in a correct position for exposure.

Another object of the invention is to provide an improved metering strip coupled to a roll of film for advancing and metering the film to locate successive predetermined increments of the film in a correct position for exposure.

Another object of the invention is to provide an improved metering strip of interleaved pull tabs having leading and trailing ends of successive pull tabs sealed together, and which eliminates the problem of seal breakage when the interleaved tabs are wound on a spool.

Another object of the invention is to provide an improved severing mechanism for a metering strip of interleaved pull tabs for at least partially severing the seal between successive pull tabs.

The invention and its objects and advantages will become more apparent from the detailed description of the preferred embodiment presented below.

Brief Description of the Drawing

In the detailed description of the preferred embodiment of the invention presented below, reference is made to the accompanying drawings, in which:

FIG. 1 is an exploded, perspective view illustrating a preferred embodiment of a film pack of this invention;

FIG. 2 is a segmental, perspective view illustrating the metering strip used in the film pack of FIG. 1;

FIG. 3 is a segmental side elevational view in section illustrating the pull tab severing mechanism of this invention; and FIG. 4 is a segmental, top plan view of the pull tabs and severing mechanism of FIG. 3 with the cover omitted.

Description of the Preferred Embodiment

With reference to FIG. 1, a film pack comprising a casing 10, a roll film metering assembly 12, and a cover 14 is disclosed for use in cameras, not shown, of the instant processing type. The casing 10 has an aperture 16 through which a film 18 of the roll film metering assembly 12 may be exposed, and parallel, spaced ribs 20, 21 on each side of aperture 16 have paired cut-outs 22 (a-e) for supporting the roll film metering assembly. The cut-outs 22e are adapted to provide bearing support for an axle 23 of a roll 24 of conventional photographic film 18. The film roll 24 may have a cover sheet leader and trailer to prevent the inadvertent exposure of the film within the pack when it is out of the camera. Guide bars 26, 28 serve to hold the film 18 flat within the exposure plane, and such guide bars 26, 28 are supported within cut-outs 22c and 22d respectively. After exposure, the film 18 is wound onto a take-up spool 30 having an axle 32 which is supported within cut-outs 22a. A pinion gear 34 is mounted on axle 32 and is adapted to mesh with a metering drive gear 36 on a drive shaft 38 supported within cut-outs 22b.

In order to advance successive predetermined increments of unexposed film 18 in correct register with exposure aperture 16, the film pack is provided with means for driving the roll film metering assembly 12 comprising a metering strip 42 of any suitable material such as Mylar or the like wound in roll form 43 on axle 38, and adapted to nest when the film pack is assembled in a compartment 45 interposed between rib 20 and the adjacent side wall of casing 10 (FIG. 1). The strip 42 as best seen in FIGS. 2 and 4 comprises a plurality of pull tabs 44 in which the leading end 46 of each tab is provided with a longitudinally extending slot 48. The trailing end 50 of each tab is provided with notches 52 on each side to form a thin necked-down portion 54 of a width less than the width of slot 48, and a horseshoe shaped cut-out portion 56 to form a finger 58 having an enlarged head 60 shown dotted in FIG. 2. The leading ends 46 of the tabs 44 are provided with indicia 61 in the form of numerals corresponding to successive lengths of film on the roll of film 18 which are to be exposed. The respective leading and trailing ends 46, 50 of successive pull tabs 44 are positioned in overlapped relation with the necked-down portion 54 in register with slot 48 and the tip of leading end 46 overlying head 60 of finger 58. The leading and trailing ends 46, 50 respectively are joined together preferably by ultrasonically produced spaced seals 62 which are applied between the tip of the trailing end 50 and the leading end 46, and a seal 64 applied between the tip of the leading end 46 and head 60. The leading end 46 of pull strip 42 normally extends through a slot 66 within the film pack and then through a slot within the camera, not shown. Pulling or advancing strip 42 manually or by any other means causes drive shaft 38 and gear 36 secured thereto to rotate in the direction of the arrow seen in FIG. 1 for driving take-up spool 30 through gear 34 in a clockwise direction for advancing film 18 in the direction of the arrow. When pull strip 42 is initially wound onto axle 38 prior to being assembled within the film pack, the necked-down portions 54 enter slots 48 (FIG. 2) to provide only a single film thickness substantially throughout its length to thereby minimize film buildup on shaft 38. Because of the overlapping of the tabs 44 on shaft 38, the radially outermost tab must cover a greater distance than does the inner tab for the same rotational angle or shaft 38 resulting in possible buckling and breakage of the seals between the tabs. This problem is overcome by the aforementioned thin, flexible and stretchable finger 58 which accommodates any change in length of the outer tab.

The film pack is further provided with a pull tab severing mechanism for at least partially severing and causing detachment of a leading pull tab 44 from the succeeding tab, and to do so at the instant that the pull tab has advanced film 18 a predetermined length and in a correct position for exposure. Accordingly, when the leading pull tab 44 detaches from the succeeding tab, film 18 will have been advanced a correct distance to locate a predetermined increment of unexposed film in register with exposure aperture 16 for exposure. The severing mechanism (FIG. 1) comprises a leaf spring 68 having one end secured by any suitable means to the bottom wall of compartment 45, and its free and adjacent slot 66 provided with a pair of spaced, inwardly extending knife blades 70. The spring 68 is biased against the under surface of the strip 42 and enters notches 52 as best seen in FIG. 4 when the leading pull tab 44 has been advanced almost to its end. Continued advance of the pull tab 44 causes knife blades 70 to pass between the leading and trailing ends 46, 50 respectively of the tabs and to at least partially sever the spaced seals 62. The cutting edges 71 of blades 70 are beveled relative to seals 62 for engaging and camming seals 62 apart, thereby placing the tab under tension in a direction transverse to its length for firmly holding the seals 62 against blades 70 during the severing operation. As soon as seals 62 are severed, continued force exerted on the leading pull tab causes thin finger 58 to break detaching the leading tab 44 from the succeeding tab. At the instant this occurs, the leading pull tab will have advanced a predetermined increment of unexposed film 18 in register with exposure aperture 16 for exposure, and the leading end 46 of the succeeding tab appears outside of camera in readiness for the next pull. Spring blades 70 will engage the leading end 46 to prevent backspringing of strip 42. The pull tabs 44 are formed of varying lengths in order to compensate for the gradually increasing diameter of film 18 on take-up spool 30, and the decreasing diameter of the strip roll on shraft 38, and thus assure that the exposure frames will be evenly spaced along the length of film 18 within the roll.

The invention has been described in detail with particular reference to a preferred embodiment thereof, but it will be understood that variations and modifications can be effected within the spirit and scope of the invention as described hereinabove.

We claim:

1. In a pull tab metering mechanism coupled to a film for automatically successively metering the film predetermined lengths, the combination comprising:
   a plurality of pull tabs in which a trailing end portion of a lead tab is sealed to the leading end portion of a succeeding tab; and severing means biased into engagement with said pull tabs and operative in response to movement of said lead tab in a direction to advance the film for at least partially severing the seal when said lead tab has been advanced a sufficient distance to meter the film a predetermined length.

2. The invention according to claim 1 wherein said trailing and leading end portions of said tabs are in overlapped relation, and said severing means comprises a blade interposable between said tab end portions for severing the seal.

3. The invention according to claim 1 wherein said trailing and leading end portions of said tabs are in overlapped relation and sealed together at least at the end of said trailing end portion, one of said trailing and leading end portions further having a notch between the ends of said end portions, and said severing means comprises a blade movable through said notch into a position between said end portions for severing the seal.

4. The invention according to claim 1 wherein said trailing and leading end portions of said tabs are in overlapped relation and sealed together at a pair of spaced points at least at the end of said trailing end portion, one of said end portions further having spaced notches between the ends of said end portions in alignment with said spaced sealed points, and said severing means comprises a pair of spaced blades movable through said notches into a position between said end portion for severing the sealed points.

5. The invention according to claim 4 wherein said severing means comprises a leaf spring having a free end biased toward said tabs and having said spaced blades at said end of said leaf.

6. The invention according to claim 5 wherein said blades extend toward one another, and are beveled relative to said sealed points for camming said sealed points apart during the severing operation when said lead tab is pulled to meter the film.

7. The invention according to claim 1 wherein said trailing and leading end portions of said successive tabs are in overlapping relation and sealed together at the end of said trailing end portion, said trailing end portion having a finger-like web portion of small cross section sealed to the end of said leading end portion, one of said end portions further having a notch, and said severing means comprises a blade movable through said notch into a position between said end portions for severing the seals at the end of said trailing end portion, said end of said leading end portion breaking at said finger-like web portion upon continued pulling of said lead tab.

8. In a film pack for an instant processing camera or the like, the combination comprising:
a housing having an exposure aperture;
film metering means within said housing for metering the film across said exposure aperture for exposure;
drive means within said housing for driving said film metering means and comprising a plurality of pull tabs in which a trailing end portion of a lead tab partially extending out of said housing is sealed to the leading end portion of a succeeding tab; and
severing means biased into engagement with said pull tabs and operative in response to movement of said lead tab in a direction to advance the film for at least partially severing the seal to cause detachment of said lead tab when it has been advanced a sufficient distance to meter a predetermined length of film across said exposure aperture.

9. The invention according to claim 8 wherein said trailing and leading end portions of said tabs are in overlapped relation, and said severing means comprises a blade interposable between said tab end portions for severing the seal.

10. The invention according to claim 8 wherein said trailing and leading end portions of said tabs are in overlapped relation and sealed together at least at the end of said trailing end portion, one of said trailing and leading end portions further having a notch between the ends of said end portions, and said severing means comprises a blade movable through said notch into a position between said end portions for severing the seal.

11. The invention according to claim 8 wherein said trailing and leading end portions of said tabs are in overlapped relation and sealed together at a pair of spaced points at least at the end of said trailing end portion, one of said end portions further having spaced notches between the ends of said end portions in alignment with said spaced sealed points, and said severing means comprises a pair of spaced blades movable through said notches into a position between said end portions for severing the sealed points.

12. The invention according to claim 11 wherein said severing means comprises a leaf spring having a free end biased toward said tabs and having said spaced blades at said end of said leaf.

13. The invention according to claim 12 wherein said blades extend toward one another, and are beveled relative to said sealed points for camming said sealed points apart during the severing operation when said lead tab is pulled to meter the film.

14. The invention according to claim 8 wherein said trailing and leading end portions of said successive tabs are in overlapping relation and sealed together at the end of said trailing end portion, said trailing end portion having a finger-like web portion of small cross section sealed to the end of said leading end portion, one of said end portions further having a notch, and said severing means comprises a blade movable through said notch into a position between said end portions for severing the seals at the end of said trailing end portion, said end of said leading end portion breaking at said finger-like web portion upon continued pulling of said lead tab.

15. A strip of pull tabs in which a trailing end portion of one tab is overlapped relative to the leading end portion of a succeeding tab, and the end only of each of said trailing and leading end portions is sealed to the succeeding and one tab respectively.

16. The invention according to claim 15 wherein one of said end portions is provided with a notch between the ends of said tab portions.

17. The invention according to claim 15 wherein the end of said trailing end portion is sealed to the other tab at spaced points, and one of said end portions is provided with a pair of spaced notches between the ends of said end portions and in alignment with said spaced sealed points.

18. The invention according to claim 15 wherein the end of said trailing end portion is sealed to said succeeding tab at spaced points, one of said end portions is provided with a pair of spaced notches between the ends of said end portions and in alignment with said spaced sealed points, and said trailing end portion has a finger-like web portion of small cross section sealed to one end of said leading end portion.

19. The invention according to claim 18 wherein said trailing end portion has a horseshoe shaped cutout to provide said finger-like web portion, said web portion further extending longitudinally toward the end of said trailing end portion.

* * * * *